(No Model.)

C. HUCK.
TELEGRAPH AND TELEPHONE CABLE.

No. 278,968. Patented June 5, 1883.

WITNESSES:

INVENTOR:

UNITED STATES PATENT OFFICE.

CHARLES HUCK, OF NEW ORLEANS, LOUISIANA.

TELEGRAPH AND TELEPHONE CABLE.

SPECIFICATION forming part of Letters Patent No. 278,968, dated June 5, 1883.

Application filed March 8, 1882. (No model.)

*To all whom it may concern:*

Be it known that I, CHARLES HUCK, of New Orleans, in the parish of Orleans and State of Louisiana, have invented a new and Improved Telegraph and Telephone Cable, of which the following is a full, clear, and exact description.

Reference is to be had to the accompanying drawings, in which similar letters of reference indicate corresponding parts in both the figures.

Figure 1:
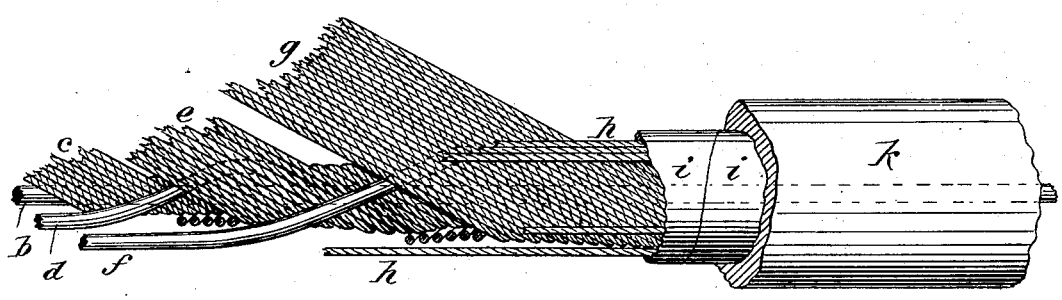
Figure 2:
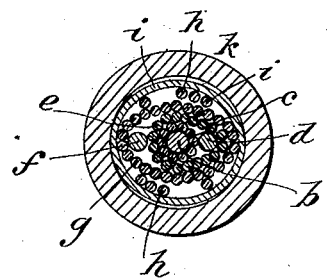

Figure 1 represents a longitudinal view of a piece of telegraph-cable broken away, and with its several wires partly unwrapped, for the purpose of illustrating the construction of the cable; and Fig. 2, a transverse section of the cable.

The object of the invention is to run the wires on poles or posts, or under ground in a protector, in such a manner that they will occupy as little space and cost as little as possible. The ground-wires are connected with the earth, so as to carry off the induced currents from the layers of insulated wires, the first ground-wire being for the first layer of insulated wires, and the second ground-wire for the second layer of insulated wires. Each insulated wire in each layer acts as a separate conductor to form an earth-circuit; or any two insulated wires may be used to form a metallic circuit. In operating the cable for telegraphic or telephonic purposes the insulated wires may be used singly or together for earth or metallic circuits.

This invention consists in a cable of novel construction, and in which a series of bare ground-wires are combined with layers of insulated wires, and the ground-wires, or certain of them, twisted or wrapped in reverse directions to the insulated wires, and not allowed to touch, whereby the ground-wires more perfectly carry off the induction, and the insulated wires are less liable to induced currents.

In the cable represented in the accompanying drawings, *b* indicates a No. 9 or other suitable-sized bare copper or good conducting wire arranged to occupy a cental position longitudinally in the cable. Around this bare wire, which forms one of the ground-wires used in the cable, is wrapped a layer of good or best insulated small copper or other conducting wires, *c*, of the usual or any other suitable size used for telegraphing and telephonic purposes. Then another large bare copper or good conducting ground-wire, *d*, is wrapped around the insulated wires *c* in a reverse direction to them, and afterward a second layer of insulated wires, *e*, wrapped around the wire *d* and wires *c* in a reverse direction to the wire *d*. Then another bare ground-wire, *f*, is wrapped around the wires *e* in a reverse direction thereto, and this in its turn inclosed by a general layer of insulated wires, *g*, wrapped in a reverse direction to the ground-wire *f*, and so on indefinitely, according to the capacity of the cable required; or there may be a lesser number of bare ground and insulated wires than above described.

Outside of the last-wrapped layer, *g*, of insulated wires may be a series of straight insulated wires, *h*.

Having been built up, as described, the several wires are protected against exposure to the weather or injury by any suitable insulating-covering, the same here being shown as consisting of a wrapper of kerite tape, *i*, and an outer tubular covering, *k*.

Each layer of insulated wires, it will be seen, takes an opposite course to the ground-wire it incloses and separates from the next adjacent ground-wire, and the wrapped ground-wires do not touch. The ground-wires carry off the induction, and the insulated wires, running in different directions to them, are less liable to induced currents than other cables as usually constructed, and which do not provide bare grounds twisted around the insulated wires, or the insulated wires wrapped to inclose the ground-wires and in a reverse direction to them, and are consequently more liable to induction.

A cable constructed as herein described may be made cheap, and be composed of a large number of wires in a small compass when suitable machinery for the purpose is used. By employing a suitable covering said cable may be used under ground, if desired.

Although the invention here has been described as a telegraph-cable, it is of course equally applicable as a telephone-cable, the purpose or use for which the electric current is transmitted through the cable forming no part of the invention.

Having thus described my invention, I claim as new and desire to secure by Letters Patent—

A telegraph or telephone cable in which is combined a bare central ground-wire, a layer of insulated wires wrapped around said ground-wire, and one or more outer bare twisted or wrapped ground-wires, and one or more layers of insulated wires wrapped in reverse directions to said wrapped ground-wires, substantially as and for the purpose or purposes specified.

CHARLES HUCK.

Witnesses:
W. W. HUCK,
W. S. DELANY.